US012640821B2

(12) United States Patent
Hua et al.

(10) Patent No.: US 12,640,821 B2
(45) Date of Patent: May 26, 2026

(54) METHOD AND DEVICE FOR CONTROLLING SHORT-RANGE WIRELESS CONNECTION, VEHICLE, TERMINAL AND MEDIUM

(71) Applicant: XIAOMI EV TECHNOLOGY CO., LTD., Beijing (CN)

(72) Inventors: Chengping Hua, Beijing (CN); Yanjiong Wang, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 313 days.

(21) Appl. No.: 18/238,418

(22) Filed: Aug. 25, 2023

(65) Prior Publication Data

US 2024/0405889 A1 Dec. 5, 2024

(30) Foreign Application Priority Data

May 31, 2023 (CN) .......................... 202310637679.4

(51) Int. Cl.
| | |
|---|---|
| *H04B 11/00* | (2006.01) |
| *H04L 5/00* | (2006.01) |
| *H04W 64/00* | (2009.01) |

(52) U.S. Cl.
CPC ............ *H04B 11/00* (2013.01); *H04L 5/0048* (2013.01); *H04W 64/003* (2013.01)

(58) Field of Classification Search
CPC .......... H04B 1/38; H04B 1/00; H01Q 1/2283; H01L 23/00; H01L 25/04; H01L 25/18
See application file for complete search history.

(56) References Cited

U.S. PATENT DOCUMENTS

| | | | | |
|---|---|---|---|---|
| 11,049,183 B1* | 6/2021 | Clauss | .................. | G06Q 40/08 |
| 2010/0304758 A1* | 12/2010 | Bury | ........................ | G01S 19/35 |
| | | | | 455/456.1 |
| 2011/0149690 A1* | 6/2011 | Okuda | ...................... | G01S 5/22 |
| | | | | 367/127 |
| 2012/0155651 A1* | 6/2012 | Obata | ..................... | H04S 3/002 |
| | | | | 381/17 |
| 2016/0255574 A1* | 9/2016 | Takae | .................. | H04W 12/069 |
| | | | | 726/7 |
| 2017/0118785 A1* | 4/2017 | Dong | .................... | H04W 4/023 |
| 2018/0352066 A1* | 12/2018 | Kim | ...................... | H04W 4/023 |

(Continued)

OTHER PUBLICATIONS

European Patent Application No. 23196060.0, Search and Opinion dated Mar. 1, 2024, 8 pages.

*Primary Examiner* — Santiago Garcia
(74) *Attorney, Agent, or Firm* — Cozen O'Connor

(57) ABSTRACT

A method and a device for controlling short-range wireless connection, a vehicle, a terminal and a medium. The method executed by an electronic control unit on the vehicle includes: controlling a loudspeaker on the vehicle to send an ultrasonic signal, in which the ultrasonic signal is configured for a target terminal to determine position information of the target terminal relative to the loudspeaker, and the target terminal is connected to the electronic control unit via the short-range wireless connection; determining whether the target terminal is located in the vehicle based on the position information in response to receiving the position information sent by the target terminal; and maintaining the short-range wireless connection in response to determining that the target terminal is located in the vehicle.

20 Claims, 8 Drawing Sheets

(56) References Cited

U.S. PATENT DOCUMENTS

| | | | |
|---|---|---|---|
| 2019/0141463 A1* | 5/2019 | Cabouli | H04R 27/00 |
| 2019/0143991 A1* | 5/2019 | Ito | B60W 40/08 |
| | | | 340/576 |
| 2020/0301976 A1* | 9/2020 | Girardier | G10L 15/28 |
| 2020/0314579 A1* | 10/2020 | Takahashi | H04R 29/002 |
| 2021/0362664 A1* | 11/2021 | Yang | G01S 13/931 |
| 2022/0240015 A1* | 7/2022 | Helm | H04S 7/30 |
| 2022/0322059 A1* | 10/2022 | Kang | H04M 1/6066 |
| 2022/0410709 A1* | 12/2022 | Florentz | B60K 35/85 |
| 2023/0066199 A1* | 3/2023 | Ucar | B60R 16/037 |
| 2023/0199374 A1* | 6/2023 | Nobile | H04R 7/12 |
| | | | 381/345 |
| 2024/0045421 A1* | 2/2024 | Yang | G05D 1/0088 |
| 2024/0264295 A1* | 8/2024 | Bariant | G01S 7/52006 |

* cited by examiner

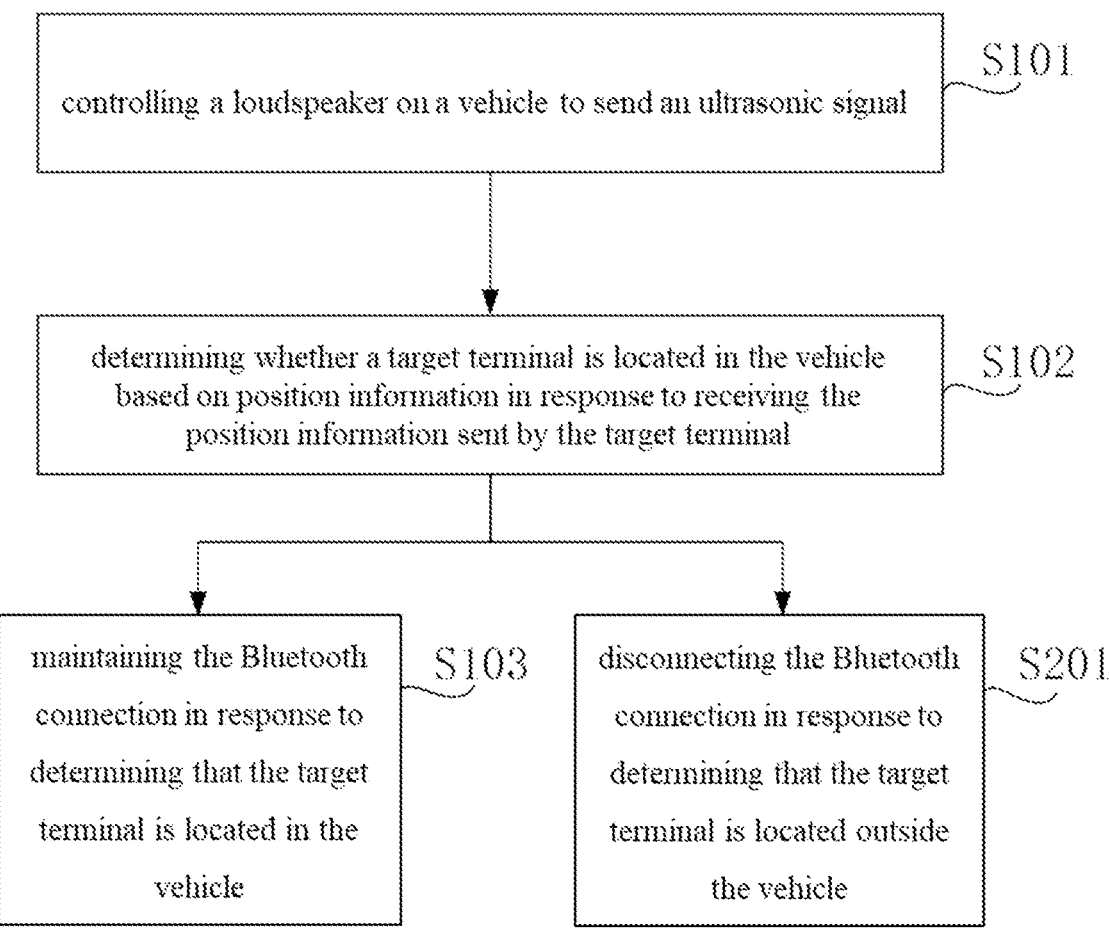

controlling a loudspeaker on a vehicle to send an ultrasonic signal — S101 determining whether a target terminal is located in the vehicle based on position information in response to receiving the position information sent by the target terminal — S102 maintaining the Bluetooth connection in response to determining that the target terminal is located in the vehicle — S103 disconnecting the Bluetooth connection in response to determining that the target terminal is located outside the vehicle — S201

Fig. 2

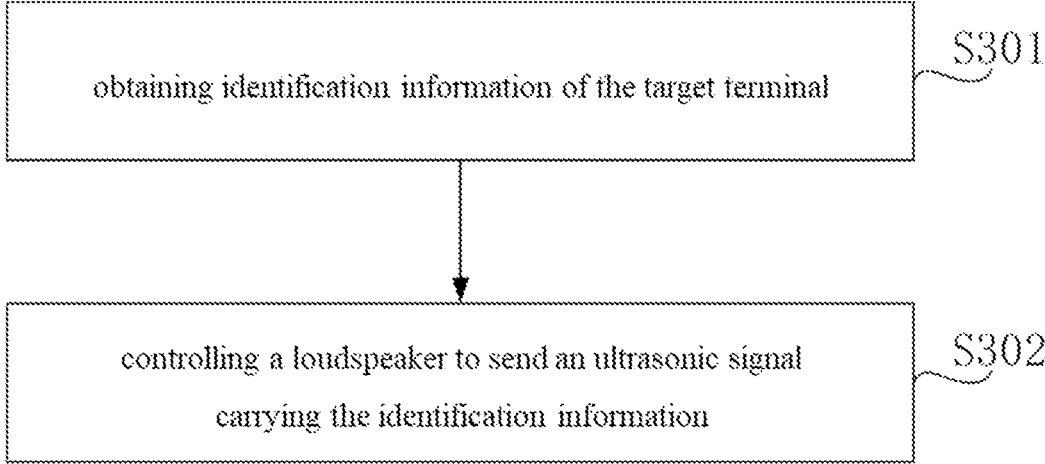

obtaining identification information of the target terminal — S301 controlling a loudspeaker to send an ultrasonic signal carrying the identification information — S302

Fig. 3

METHOD AND DEVICE FOR CONTROLLING SHORT-RANGE WIRELESS CONNECTION, VEHICLE, TERMINAL AND MEDIUM

CROSS-REFERENCE TO RELATED APPLICATIONS

The present application claims the benefit of priority to Chinese Application No. 202310637679.4, filed on May 31, 2023, the contents of which are incorporated herein by reference in their entireties for all purposes.

BACKGROUND

When a user wants a vehicle to play music from a terminal (e.g. a mobile phone, a smart wearable device, a tablet computer, a computer, etc.), a vehicle speaker may be paired to the terminal via vehicle-mounted short-range wireless technology such as Bluetooth®. A pleasant and convenient short-range wireless music playing experience is important for the user.

SUMMARY

The disclosure relates to the field of short-range wireless technology such as Bluetooth®, in particular to a method and a device for controlling a short-range wireless connection, a vehicle, a terminal and a medium.

A first aspect of disclosure, there is provided a method for controlling short-range wireless connection, executed by an electronic control unit on a vehicle, includes: controlling a loudspeaker on the vehicle to send an ultrasonic signal, in which the ultrasonic signal is configured for a target terminal to determine position information of the target terminal relative to the loudspeaker, and the target terminal is connected to the electronic control unit via the short-range wireless connection; determining whether the target terminal is located in the vehicle based on the position information in response to receiving the position information sent by the target terminal; and maintaining the short-range wireless connection in response to determining that the target terminal is located in the vehicle.

According to a second aspect of the disclosure, there is provided a method for controlling a short-range wireless connection, executed by a terminal, includes: receiving an ultrasonic signal sent by a loudspeaker on a vehicle; determining position information of the terminal relative to the loudspeaker based on the ultrasonic signal; and sending the position information to an electronic control unit on the vehicle, in which the position information is configured for the electronic control unit to determine whether to maintain the short-range wireless connection with the terminal.

According to a third aspect of the disclosure, there is provided a device for controlling short-range wireless connection, including: a first controlling module configured to control a loudspeaker on a vehicle to send an ultrasonic signal, in which the ultrasonic signal is configured for a target terminal to determine position information of the target terminal relative to the loudspeaker, and the target terminal is connected to the electronic control unit via the short-range wireless connection; and a first determining module configured to determine whether the target terminal is located in the vehicle based on the position information in response to receiving the position information sent by the target terminal; in which the first controlling module is further configured to maintain the short-range wireless connection in response to the first determining module determining that the target terminal is located in the vehicle.

BRIEF DESCRIPTION OF THE DRAWINGS

The accompanying drawings are used to provide a further understanding for embodiments of the disclosure, and constitute a part of the specification. The accompanying drawings are used to explain the disclosure together with embodiments of the disclosure, and do not constitute a limitation for the disclosure. In the accompanying drawings:

FIG. 2 is a flow chart illustrating a method for controlling a short-range wireless connection according to another embodiment of the disclosure.

FIG. 3 is a flow chart illustrating a method for controlling a loudspeaker on a vehicle to send an ultrasonic signal in a method for controlling a short-range wireless connection according to another embodiment of the disclosure.

DETAILED DESCRIPTION

Specific embodiments of the disclosure will be described in detail below with reference to the accompanying drawings. It should be understood that, the specific embodiments described herein are only used to explain the disclosure rather than to limit the disclosure.

It should be noted that all acts of obtaining signals, information or data in the disclosure are performed in compliance with data protection laws and policies of relevant countries and with authorization granted by device owners.

Figure 1:
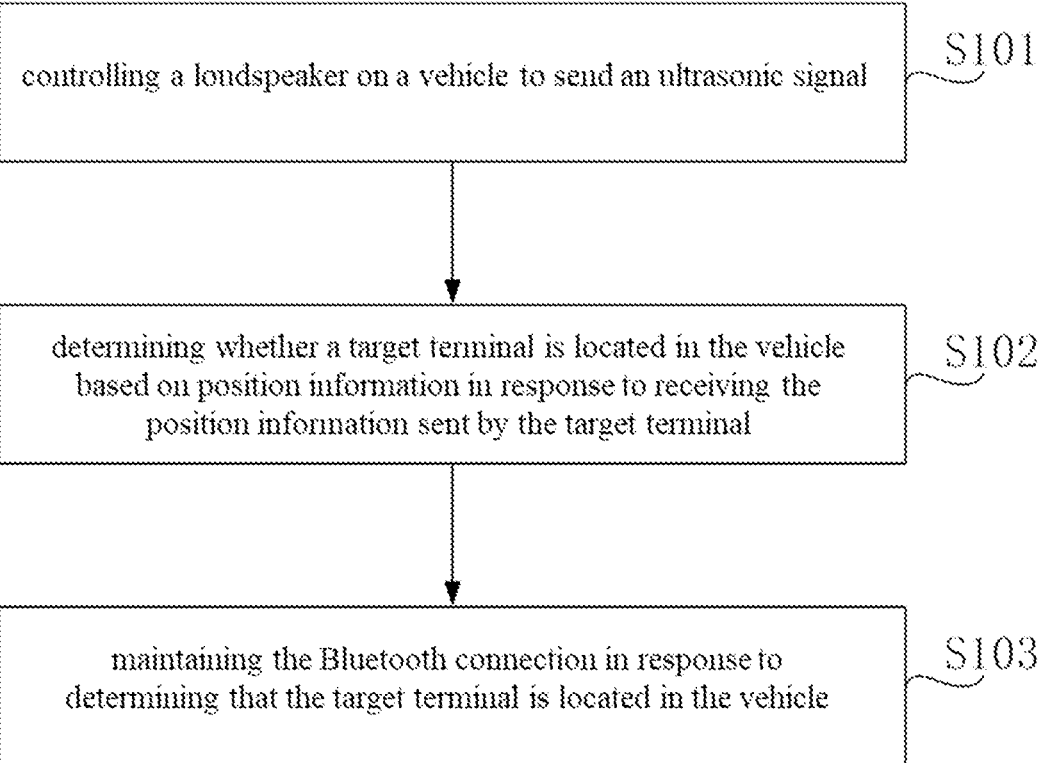
FIG. 1 is a flow chart illustrating a method for controlling a short-range wireless, such as Bluetooth® connection according to an embodiment of the disclosure.

The embodiment shows a flow chart illustrating a method for controlling a short-range wireless connection. The method may be executed by an electronic control unit on a vehicle. The electronic control unit may be, for example, a vehicle-mounted multimedia host (short for head unit), a vehicle control unit (VCU), a cockpit domain controller and the like. As shown in FIG. 1, the method may include the following steps from S101 to S103.

At block S101, a loudspeaker on the vehicle is controlled to send an ultrasonic signal, in which the ultrasonic signal is configured for a target terminal to determine position information of the target terminal relative to the loudspeaker, and the target terminal is connected to the electronic control unit via the short-range wireless connection.

At block S102, it is determined whether the target terminal is located in the vehicle based on the position information in response to receiving the position information sent by the target terminal.

At block S103, the short-range wireless connection is maintained in response to determining that the target terminal is located in the vehicle.

A driver or passenger of the vehicle carries a terminal (e.g. a mobile phone, a smart wearable device, a tablet computer, etc.) into the vehicle and then closes a door. When the user wants the vehicle to play music from the terminal, the electronic control unit is connected to the terminal via vehicle-mounted short-range wireless.

In the related art, in terms of control of short-range wireless disconnection, as long as the vehicle engine is stopped and a door on a driver's side is opened, the electronic control unit actively disconnects the short-range wireless connection even if a user is still in the vehicle and does not get out of the vehicle, thereby causing short-range wirelessmusic playing to stop and causing the user to feel bad.

In embodiments of the disclosure, the electronic control unit may control the loudspeaker on the vehicle to send the ultrasonic signal in case it is confirmed that the vehicle is powered on and the door is closed. For example, there may be two or more loudspeakers mounted on the vehicle at the roof of the vehicle, at the door of the vehicle, and at any spatial location within the vehicle that may be available for mounting. Controlling the loudspeaker to send the ultrasonic signal may be one of controlling the loudspeaker to send the ultrasonic signal once, or continuously send the ultrasonic signal, or periodically send the ultrasonic signal. Ultrasonic frequency may for example be above 20 KHz.

The electronic control unit controls each loudspeaker on the vehicle to send the ultrasonic signal, and the ultrasonic signal may carry position information of the loudspeaker, and the position information may be actual position information of the loudspeaker in the vehicle. The ultrasonic signal sent by each loudspeaker may carry the position information of the loudspeaker.

There may be a plurality of terminals in the vehicle at the same time, and each terminal may receive the ultrasonic signal sent by the loudspeaker through its own microphone. However, in embodiments of the disclosure, the terminal that has established the short-range wireless connection with the electronic control unit is determined as the target terminal. After receiving the ultrasonic signal, the target terminal may determine the position information of the target terminal relative to the loudspeaker, which is configured for representing relative position information of the target terminal relative to the loudspeaker, by using an ultrasonic positioning technology based on the position information of the loudspeaker carried in the ultrasonic signal. The target terminal may then send the determined position information of the target terminal relative to the loudspeaker to the electronic control unit, for example via short-range wireless connection between the target terminal and the electronic control unit.

After the electronic control unit receives the position information sent from the target terminal, the electronic control unit may determine the position information of the target terminal (the position information is configured for representing an absolute position of the target terminal) based on pre-stored position information of the loudspeaker (the position information is configured for representing an absolute position of the loudspeaker) and the received position information of the target terminal relative to the loudspeaker. The electronic control unit may determine whether the target terminal is located in the vehicle based on the determined position information of the target terminal, i.e., the absolute position of the target terminal.

The position information of the target terminal relative to the loudspeaker may include, but is not limited to, distance information and azimuth angle information of the target terminal relative to the loudspeaker. The electronic control unit may determine the position information of the target terminal, i.e. an actual position of the target terminal, based on the position information of the target terminal relative to the loudspeaker and the position information of the loudspeaker. For example, coordinate position information of the loudspeaker is pre-stored in the electronic control unit. After obtaining the distance information and the azimuth angle information of the target terminal relative to the loudspeaker, coordinate position information of the target terminal may be calculated, i.e. the position information of the target terminal may be obtained.

As an example, the electronic control unit may calculate a plurality of pieces of the position information of the target terminal based on the position information of the target terminal relative to each loudspeaker and the position information of each loudspeaker, and finally determine the position information of the target terminal by combining the plurality of pieces of position information. For example, averaging the plurality of pieces of position information to obtain final position information of the target terminal.

The short-range wireless connection with the target terminal may be continuously maintained when the electronic control unit determines that the target terminal is located in the vehicle. That is to say, in case that the electronic control unit is playing audio from the target terminal via short-range wireless, the playing of the short-range wireless audio may be continued by continuing to maintain the short-range wireless connection between the electronic control unit and the target terminal. Even if the vehicle engine is stopped (at this time, the vehicle is not powered down) and the user opens the door on the driver's side, when it is determined by ultrasonic positioning that the terminal is still in the vehicle, it may be inferred that the user does not get off the vehicle, and therefore continuing to play the short-range wireless audio may improve the user experience.

With the above-mentioned technical solution, the electronic control unit may control the loudspeaker to send the ultrasonic signal, and after receiving the ultrasonic signal sent by the loudspeaker, the target terminal may determine the position information of the target terminal relative to the loudspeaker by using the ultrasonic positioning technology. The target terminal may then send the determined position information of the target terminal relative to the loudspeaker to the electronic control unit. The electronic control unit may determine whether the target terminal is located in the vehicle based on the position information of the target terminal relative to the loudspeaker, to realize accurate positioning of the target terminal by the electronic control unit. When the electronic control unit determines that the target terminal is located in the vehicle, the short-range wireless connection with the target terminal may be continuously maintained, so that a short-range wireless audio may be continuously played. Even if the user opens the door of the vehicle, it may be inferred that the user does not get off the vehicle when it is determined by the ultrasonic positioning that the terminal is still in the vehicle, and therefore continuing to play the short-range wireless audio may improve the user experience.

FIG. 2 is a flow chart illustrating a method for controlling short-range wireless connection according to another embodiment of the disclosure. As shown in FIG. 2, the method further includes the following step S201.

At block S201, the short-range wireless connection is disconnected in response to determining that the terminal is located outside the vehicle.

In the related art, there is also a short-range wireless disconnection control solution between the electronic control unit and the terminal, that is: a control condition of the short-range wireless disconnection is not that the vehicle engine is stopped and the door on the driver's side is opened, but based on a distance between the electronic control unit and the terminal (the distance may be determined by a short-range wireless signal strength). For example, when the distance between the terminal and the electronic control unit exceeds a preset distance, and the short-range wireless signal strength between the terminal and the electronic control unit is lower than a preset threshold, the electronic control unit disconnects the short-range wireless connection with the terminal. In this scenario, in case that the driver gets off the vehicle and carries the terminal away from the vehicle for a certain distance, and the distance does not exceed the preset distance, that is, the distance does not exceed range of the short-range wireless connection, the short-range wireless audio is still played in the vehicle, which results in unnecessary power consumption.

In embodiments of the disclosure, when the electronic control unit determines that the target terminal is located outside the vehicle via the ultrasonic positioning technology, the short-range wireless connection with the target terminal may be actively disconnected. That is to say, in case that the electronic control unit is playing the audio from the target terminal via the short-range wireless, the playing of the short-range wireless audio may be stopped by disconnecting the short-range wireless connection between the electronic control unit and the target terminal, thereby solving the problem that the short-range wireless audio is still played in the vehicle when the terminal carried by the user is located outside the vehicle, improving the user experience, avoiding the unnecessary power consumption and being beneficial to energy saving.

FIG. 3 is a flow chart illustrating a method for controlling a loudspeaker on a vehicle to send an ultrasonic signal in a method for controlling a short-range wireless connection according to another embodiment of the disclosure. As shown in FIG. 3, controlling the loudspeaker on the vehicle to send the ultrasonic signal may include the following steps S301 to S302.

At block S301, identification information of the target terminal is obtained.

At block S302, the loudspeaker is controlled to send the ultrasonic signal, in which the ultrasonic signal carries the identification information.

In embodiments of the disclosure, the electronic control unit obtains the identification information of the target terminal, for example, through the short-range wireless connection between the electronic control unit and the target terminal. As an example, the identification information of the target terminal may be MAC (Media Access Control) address information of the target terminal, or a short-range wireless address information of the target terminal, or device identification code information of the target terminal, or any identification information that may uniquely identify the target terminal. After the electronic control unit obtains the identification information of the target terminal, the loudspeaker may be controlled to send ultrasonic information, and the ultrasonic signal carries the identification information of the target terminal obtained by the electronic control unit.

In this way, after each terminal in the vehicle receives the ultrasonic signal, each terminal may obtain the identification information carried by the ultrasonic signal. Thus, the terminal may determine whether it is the target terminal by comparing the identification information of the terminal with the identification information carried by the ultrasonic signal. For example, when comparison result indicates that two pieces of identification information are consistent, it is determined that the terminal is the target terminal. After determining the terminal as the target terminal, the terminal may perform a subsequent operation of determining the position information of the terminal relative to the loudspeaker based on the ultrasonic signal, i.e. performing an operation of ultrasonic positioning. In the case where it is determined that the terminal is not the target terminal, the terminal may not perform the operation of ultrasonic positioning.

With the above-mentioned technical solution, the electronic control unit may obtain the identification information of the target terminal connected to the electronic control unit via the short-range wireless, and then may carry the identification information of the target terminal in the ultrasonic signal and send the identification information out. In this way, the ultrasonic signal contains unique identification information that may determine whether the terminal is the target terminal. Therefore, it may be ensured that only the terminal that has established the short-range wireless connection with the electronic control unit performs the subsequent operation of ultrasonic positioning, and other in-vehicle terminals do not need to perform the ultrasonic positioning even if they receive the ultrasonic signal, thereby avoiding unnecessary operations.

Figure 4:
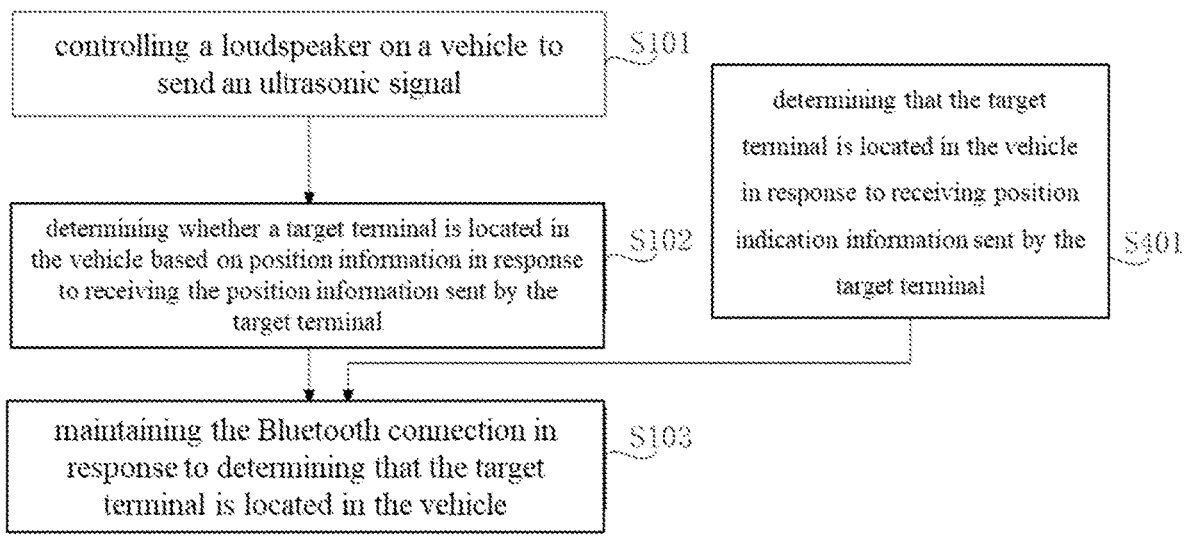
FIG. 4 is a flow chart illustrating a method for controlling a short-range wireless connection according to yet another embodiment of the disclosure.

FIG. 4 is a flow chart illustrating a method for controlling a short-range wireless connection according to yet another embodiment of the disclosure. As shown in FIG. 4, the method may include the following step S401.

At block S401, it is determined that the target terminal is located in the vehicle in response to receiving position indication information sent by the target terminal, in which the position indication information is configured for indicating that the target terminal is located in the vehicle.

In embodiments of the disclosure, the electronic control unit may also receive the position indication information sent by the target terminal, for example, via the short-range wireless connection between the electronic control unit and the target terminal. In this embodiment, the target terminal may determine whether the target terminal is located in the vehicle through relevant positioning techniques.

As an example, the target terminal may determine whether the target terminal is located in the vehicle based on the short-range wireless signal strength between the target terminal and the electronic control unit. Alternatively, the target terminal may determine whether the target terminal is located in the vehicle based on the short-range wireless signal strength between the target terminal and the electronic control unit, and a moving state of the target terminal. The moving state may represent whether the terminal is currently in the moving state or a stationary state. It may be determined that the target terminal is located outside the vehicle in case that the short-range wireless signal strength becomes smaller and the target terminal is currently in the moving state. It may be determined that the target terminal is located in the vehicle in case that the short-range wireless signal strength is greater than a preset threshold of the short-range wireless signal strength.

Upon determining that the target terminal is located in the vehicle, the target terminal may send the position indication information to the electronic control unit, in which the position indication information may indicate that the target terminal is located in the vehicle. In this way, the electronic control unit may determine that the target terminal is located in the vehicle after receiving the position indication information. In this way, the electronic control unit may continue to maintain the short-range wireless connection with the target terminal.

With the above-mentioned technical solution, a determining manner of whether the target terminal is located in the vehicle is added for the electronic control unit, namely, the target terminal is determined to be located in the vehicle via the position indication information sent by the target terminal. In this way, under a condition that whether the target terminal is located in the vehicle may not be determined via the ultrasonic positioning technology due to in-vehicle interference (at this moment, the electronic control unit may not receive the position information sent by the target terminal), the electronic control unit may also determine that the target terminal is located in the vehicle under a condition that the electronic control unit receives the position indication information. Accordingly, the short-range wireless connection with the target terminal is maintained, the playing of the short-range wireless audio is continuously maintained, thereby improving the user experience.

Figure 5:
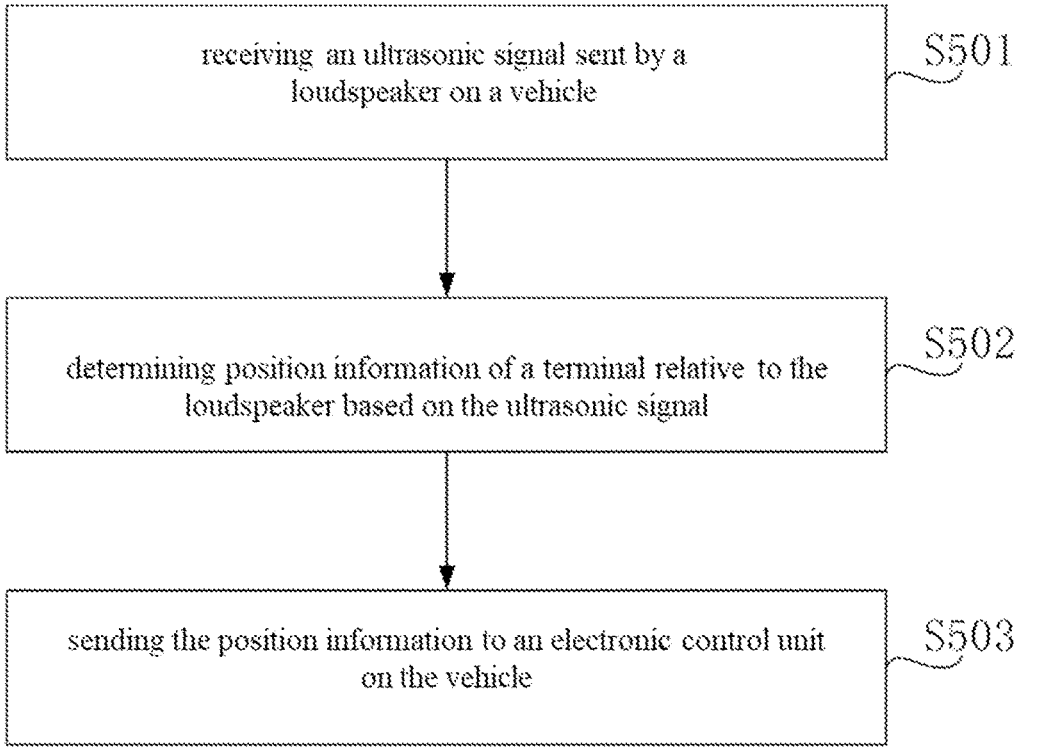
FIG. 5 is a flow chart illustrating a method for controlling a short-range wireless connection according to an embodiment of the disclosure.

FIG. 5 is a flow chart illustrating a method for controlling short-range wireless connection according to an embodiment of the disclosure, in which the method may be executed by the terminal, such as a mobile phone, a smart wearable device, a tablet computer and the like. As shown in FIG. 5, the method may include the following steps S501 to S503.

At block S501, an ultrasonic signal sent by a loudspeaker on a vehicle is received.

At block S502, position information of the terminal relative to the loudspeaker is determined based on the ultrasonic signal.

At block S503, the position information is sent to the electronic control unit on the vehicle, in which the position information is configured for the electronic control unit to determine whether to maintain the short-range wireless connection with the terminal.

In embodiments of the disclosure, the terminal may receive the ultrasonic signal sent by the loudspeaker through its own microphone, and the ultrasonic signal sent by the loudspeaker carries the position information of the loudspeaker. The terminal may calculate a relative position of the terminal and each loudspeaker based on the ultrasonic positioning technology. The terminal then sends the calculated position information of the terminal relative to the loudspeaker to the electronic control unit, for example, via the short-range wireless connection between the terminal and the electronic control unit. The electronic control unit may determine whether the terminal is located in the vehicle and further determine whether to maintain the short-range wireless connection with the terminal based on the received positional information of the terminal relative to the loudspeaker.

As an example, after the electronic control unit receives the position information sent from the terminal, the electronic control unit may determine the position information of the terminal (the position information is configured for representing the absolute position of the terminal) based on the pre-stored position information of the loudspeaker (the position information is configured for representing the absolute position of the loudspeaker) and the received position information of the terminal relative to the loudspeaker. The electronic control unit may determine whether the target terminal is located in the vehicle based on the determined position information of the terminal, that is, the absolute position of the terminal.

The short-range wireless connection with the terminal may continue to be maintained when the electronic control unit determines that the terminal is located in the vehicle. That is to say, in case that the electronic control unit is playing the audio from the target terminal via the short-range wireless, the short-range wireless audio may be played continuously by continuing to maintain the short-range wireless connection between the electronic control unit and the target terminal. Even if the vehicle engine is stopped and the user opens the door on the driver's side, it may be inferred that the user does not get off the vehicle when it is determined via the ultrasonic positioning that the terminal is still in the vehicle, and therefore continuing to play the short-range wireless audio may improve the user experience.

Figure 6:
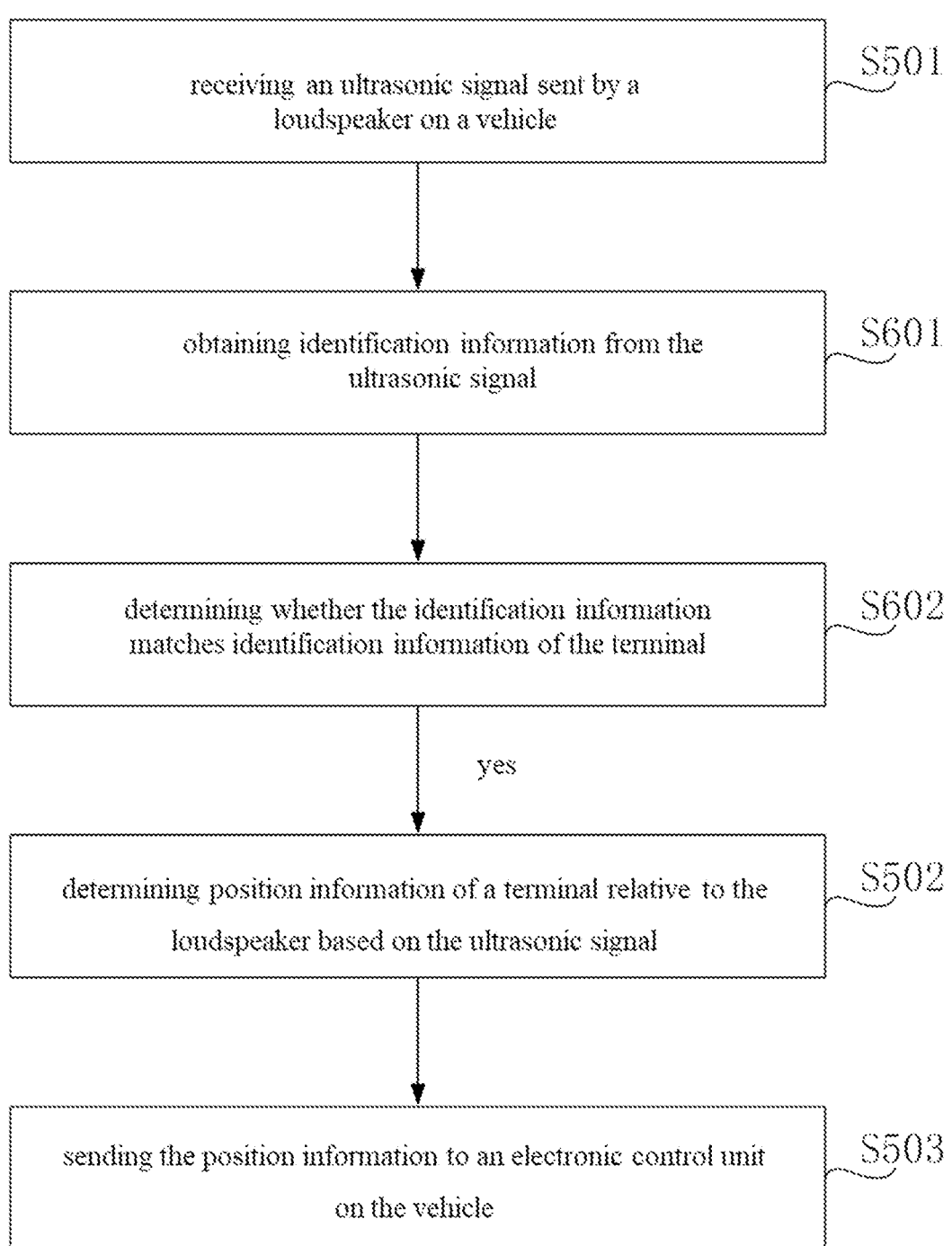
FIG. 6 is a flow chart illustrating a method for controlling a short-range wireless connection according to yet another embodiment of the disclosure.

FIG. 6 is a flow chart illustrating a method for controlling short-range wireless connection according to yet another embodiment of the disclosure. In this embodiment, the ultrasonic signal carries identification information of an apparatus connected to the electronic control unit via the short-range wireless. As shown in FIG. 6, the method may further include the following steps S601 to S602.

At block S601, the identification information from the ultrasonic signal is obtained.

At block S602, it is determined whether the identification information matches identification information of the terminal.

A step of determining the position information of the terminal relative to the loudspeaker based on the ultrasonic signal i.e., S502, is performed in response to determining that the identification information matches identification information of the terminal.

In embodiments of the disclosure, there may be a plurality of terminals in the vehicle, and each terminal may receive the ultrasonic signal sent by the loudspeaker through its own microphone. Since the ultrasonic signal carries the identification information of the apparatus connected to the electronic control unit via the short-range wireless, it may be determined whether the identification information carried by the ultrasonic signal matches the identification information of the terminal by comparing the two pieces of identification information after the terminal receives the ultrasonic signal. For example, it is determined that the two pieces of identification information are matched in case that the two pieces of identification information are consistent. In case that it is determined that the identification information carried by the ultrasonic signal matches the identification information of the terminal, it may be known that the terminal is the apparatus connected to the electronic control unit via the short-range wireless, i.e. the target terminal described above, which needs to perform the subsequent operation of ultrasonic positioning. However, in case that it is determined that the identification information carried by the ultrasonic signal does not match the identification information of the terminal, it may be determined that the terminal is not the apparatus connected to the electronic control unit via the short-range wireless, and at this time, the terminal may not perform the subsequent operation of ultrasonic positioning.

Referring to the above, the identification information of the apparatus connected to the electronic control unit via the short-range wireless may be MAC address information of the apparatus, or short-range wireless address information of the apparatus, or device identification code information of the apparatus, or any identification information that may uniquely identify the apparatus.

With the above-mentioned technical solution, the electronic control unit may carry the identification information of the apparatus connected to the electronic control unit via the short-range wireless in the ultrasonic signal and send the identification information out. In this way, the ultrasonic signal contains the unique identification information that may determine whether the terminal is the apparatus connected to the electronic control unit via the short-range wireless. Therefore, it may be ensured that only the terminal that has established the short-range wireless connection with the electronic control unit performs the subsequent operation of ultrasonic positioning, and other in-vehicle terminals do not need to perform the ultrasonic positioning even if they receive the ultrasonic signal, thereby avoiding unnecessary operations.

Figure 7:
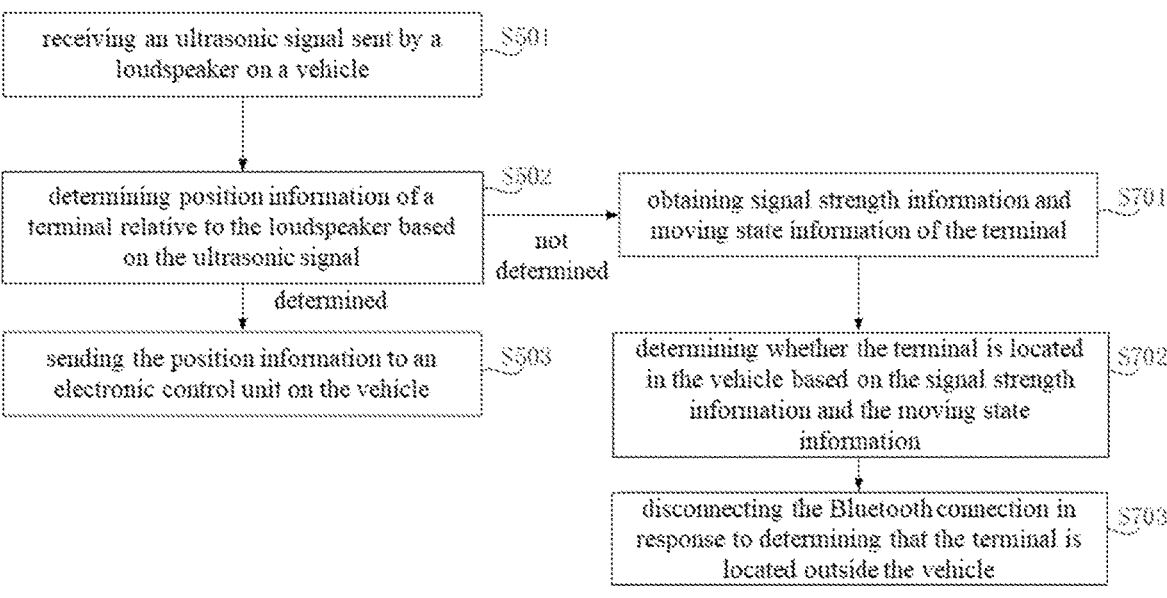
FIG. 7 is a flow chart illustrating a method for controlling a short-range wireless connection according to yet another embodiment of the disclosure.

FIG. 7 is a flow chart illustrating a method for controlling short-range wireless connection according to yet another embodiment of the disclosure. As shown in FIG. 7, the method may further include the following steps S701 to S703.

At block S701, signal strength information and moving state information of the terminal are obtained in case that the position information is not determined, in which the signal strength information is configured for representing a short-range wireless signal strength between the terminal and the electronic control unit.

At block S702, it is determined whether the terminal is located in the vehicle based on the signal strength information and the moving state information.

At block S703, the short-range wireless connection is disconnected in response to determining that the terminal is located outside the vehicle.

In embodiments of the disclosure, the terminal may be unable to determine the position information based on the ultrasound signal due to the in-vehicle interference. For example, the terminal may not receive any ultrasonic signal sent by the loudspeaker, or the received ultrasonic signal is incomplete, or the ultrasonic signal sent by a part of the loudspeakers is not received, or other situations where the position information may not be determined based on the ultrasonic signal. In the case where the terminal may not determine the position information based on the ultrasonic signal, the terminal may determine whether it is located in the vehicle based on the short-range wireless signal strength between the terminal and the electronic control unit, and the moving state information.

The moving state information is configured for representing whether the terminal is currently in the moving state or the stationary state. As an example, its own moving state information may be obtained through an acceleration sensor provided on the terminal. A magnitude of the short-range wireless signal strength may represent the distance between the terminal and the electronic control unit. Therefore, it may be determined whether the terminal is located in the vehicle by combining the moving state information and the magnitude of the short-range wireless signal strength.

Upon determining that the terminal is outside the vehicle, the terminal may actively disconnect the short-range wireless connection with the electronic control unit.

With the above-mentioned technical solution, when the terminal may not determine the position information based on the ultrasonic signal, it may still determine whether the terminal is located in the vehicle by an auxiliary positioning manner, i.e., combining the signal strength information and the moving state information, so that the terminal may still relatively accurately determine the position of the terminal relative to the vehicle when the ultrasonic positioning fails, and actively disconnect the short-range wireless connection with the electronic control unit when it is determined that the terminal is located outside the vehicle to stop the playing of the short-range wireless audio, and avoid the unnecessary power consumption while improving the user experience.

As an example, the step S702 may further include:

It is determined that the terminal is located outside the vehicle in case that the signal strength information becomes smaller and the moving state information represents that the terminal is currently in the moving state.

When the signal strength information becomes smaller and the moving state information represents that the terminal is currently in the moving state, this means that the user is moving outside the vehicle. At this time, the terminal may determine that it is outside the vehicle, and actively disconnect the short-range wireless connection with the electronic control unit.

Figure 8:
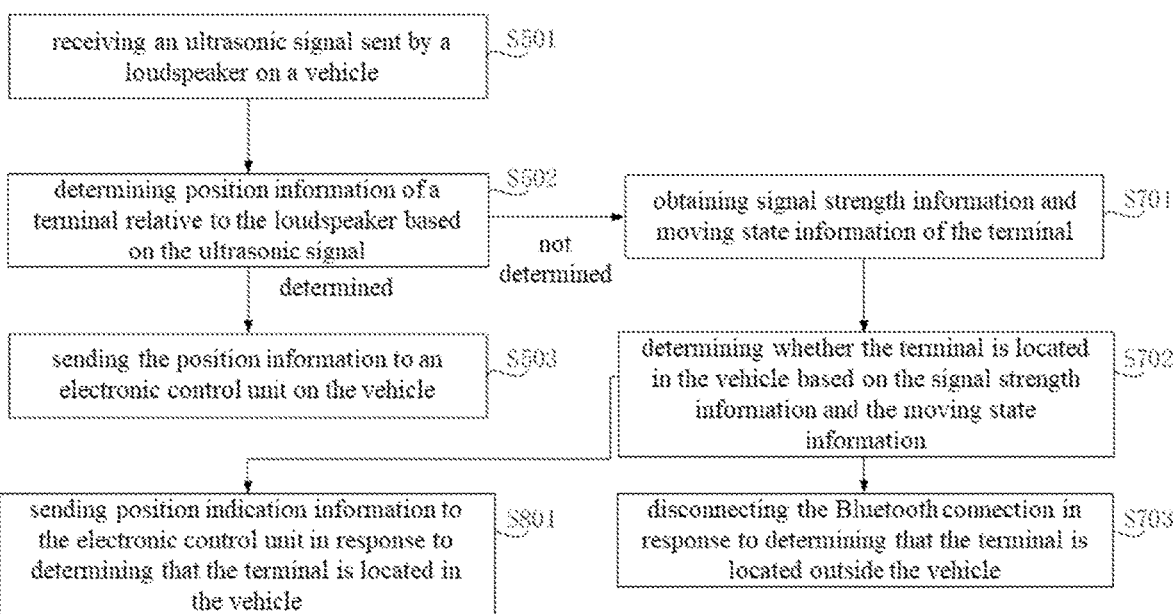
FIG. 8 is a flow chart illustrating a method for controlling a short-range wireless connection according to yet another embodiment of the disclosure.

FIG. 8 is a flow chart illustrating a method for controlling short-range wireless connection according to yet another embodiment of the disclosure. As shown in FIG. 8, the method may further include the following step S801.

At block S801, position indication information is sent to the electronic control unit in response to determining that the terminal is located in the vehicle, in which the position indication information is configured for indicating that the terminal is located in the vehicle, so that the electronic control unit maintains the short-range wireless connection.

With the above-mentioned technical solution, a determining manner of whether the terminal is located in the vehicle is added for the electronic control unit, namely, the terminal is determined to be located in the vehicle via the position indication information sent by the terminal. In this way, under a condition that whether the terminal is located in the vehicle may not be determined via the ultrasonic positioning technology due to the in-vehicle interference (at this moment, the electronic control unit may not receive the position information sent by the terminal), the electronic control unit may also determine that the terminal is located in the vehicle under the condition that the electronic control unit receives the position indication information. Accordingly, the short-range wireless connection with the target terminal is maintained, the playing of the short-range wireless audio is continuously maintained, thereby improving the user experience.

Figure 9:
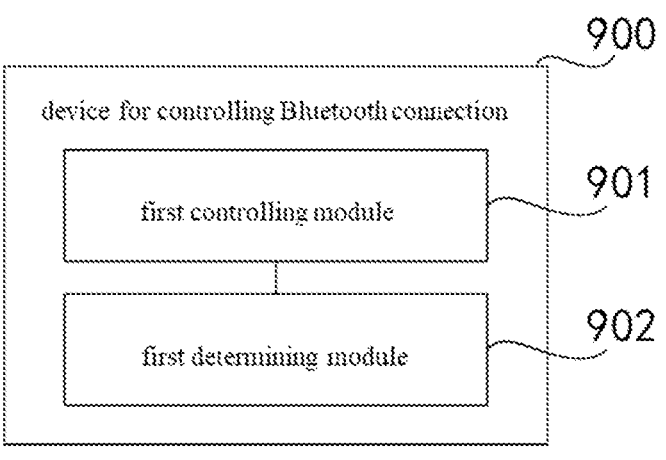
FIG. 9 is a structural block diagram illustrating a device for controlling a short-range wireless connection according to an embodiment of the disclosure.

FIG. 9 is a structural block diagram illustrating a device for controlling short-range wireless connection according to an embodiment of the disclosure. The device 900 for controlling the Short-range wireless connection may be applied to the electronic control unit on the vehicle, and the electronic control unit may be, for example, the vehicle-mounted multimedia host, the vehicle control unit, the cockpit domain controller and the like. As shown in FIG. 9, the device 900 for controlling the short-range wireless connection may include:

a first controlling module 901 configured to control a loudspeaker on the vehicle to send an ultrasonic signal, in which the ultrasonic signal is configured for the target terminal to determine position information of the target terminal relative to the loudspeaker, and the target terminal is connected to the electronic control unit via the short-range wireless connection; and a first determining module 902 configured to determine whether the target terminal is located in the vehicle based on the position information in response to receiving the position information sent by the target terminal;

the first controlling module 901 is further configured to maintain the short-range wireless connection in response to the first determining module 902 determining that the target terminal is located in the vehicle.

With the above-mentioned technical solution, the electronic control unit may control the loudspeaker to send the ultrasonic signal, and after receiving the ultrasonic signal sent by the loudspeaker, the target terminal may determine the position information of the target terminal relative to the loudspeaker by using the ultrasonic positioning technology. The target terminal may then send the determined position information of the target terminal relative to the loudspeaker to the electronic control unit. The electronic control unit may determine whether the target terminal is located in the vehicle based on the position information of the target terminal relative to the loudspeaker, to realize the accurate positioning of the target terminal by the electronic control unit. When the electronic control unit determines that the target terminal is located in the vehicle, the short-range wireless connection with the target terminal may be continuously maintained, so that the short-range wireless audio may be continuously played. Even if the user opens the door of the vehicle, it may be inferred that the user does not get off the vehicle when it is determined via the ultrasonic positioning that the terminal is still in the vehicle, and therefore continuing to play the short-range wireless audio may improve the user experience.

In one possible implementation, the first controlling module 901 may also be configured to disconnect the short-range wireless connection in response to the first determining module 902 determining that the target terminal is located outside the vehicle.

In one possible implementation, the first controlling module 901 may include a first obtaining submodule configured to obtain identification information of the target terminal; and a controlling submodule is configured to control the loudspeaker to send the ultrasonic signal, in which the ultrasonic signal carries the identification information.

In one possible implementation, the first determining module 902 may also be configured to determine that the target terminal is located in the vehicle in response to receiving position indication information sent by the target terminal, in which the position indication information is configured for indicating that the target terminal is located in the vehicle.

Figure 10:
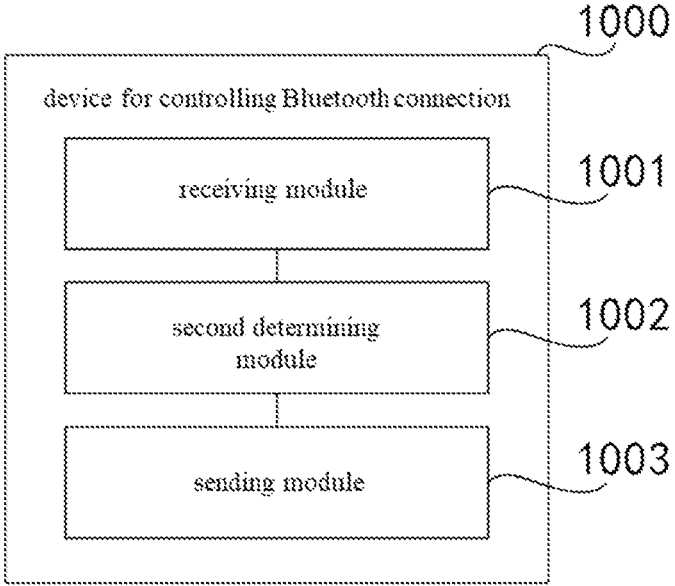
FIG. 10 is a structural block diagram illustrating a device for controlling a short-range wireless connection according to an embodiment of the disclosure.

FIG. 10 is a structural block diagram illustrating the device 1000 for controlling the short-range wireless connection according to an embodiment of the disclosure. The device 1000 for controlling the short-range wireless connection may be applied to the terminal, and the terminal may be, for example, the mobile phone, the smart wearable device, the tablet computer and the like. As shown in FIG. 10, the device 1000 for controlling the short-range wireless connection may include:

a receiving module 1001 configured to receive an ultrasonic signal sent by a loudspeaker on a vehicle;

a second determining module 1002 configured to determine position information of the terminal relative to the loudspeaker based on the ultrasonic signal; and a sending module 1003 configured to send the position information to the electronic control unit on the vehicle, in which the position information is configured for the electronic control unit to determine whether to maintain the short-range wireless connection with the terminal.

With the above-mentioned technical solution, after receiving the ultrasonic signal sent by the loudspeaker, the target terminal may determine the position information of the target terminal relative to the loudspeaker by using the ultrasonic positioning technology. The target terminal may then send the position information of the target terminal relative to the loudspeaker to the electronic control unit, so that the electronic control unit may determine whether the target terminal is located in the vehicle based on the position information of the target terminal relative to the loudspeaker, thereby realizing the accurate positioning of the target terminal by the electronic control unit. When the electronic control unit determines that the target terminal is located in the vehicle, the short-range wireless connection with the target terminal may be continuously maintained, so that the short-range wireless audio may be continuously played. Even if the user opens the door of the vehicle, it may be inferred that the user does not get off the vehicle when it is determined via the ultrasonic positioning that the terminal is still in the vehicle, and therefore continuing to play the short-range wireless audio may improve the user experience.

In one possible implementation, the ultrasonic signal carries identification information of the apparatus connected to the electronic control unit via the short-range wireless. The device 1000 for controlling the short-range wireless connection may further include: a first obtaining module configured to obtain the identification information from the ultrasonic signal; and a second determining module 1002 further configured to determine the position information of the terminal relative to the loudspeaker based on the ultrasonic signal in response to determining that the identification information matches identification information of the terminal.

In one possible implementation, the device 1000 for controlling the short-range wireless connection may further include: a second obtaining module configured to obtain signal strength information and moving state information of the terminal in case that the position information is not determined by the second determining module 1002, in which the signal strength information is configured for representing the signal strength of the short-range wireless between the terminal and the electronic control unit; a third determining module configured to determine whether the terminal is located in the vehicle based on the signal strength information and the moving state information; and a second controlling module configured to disconnect the short-range wireless connection in response to the third determining module determining that the terminal is located outside the vehicle.

In one possible implementation, the sending module 1003 may be further configured to send position indication information to the electronic control unit in response to the third determining module determining that the terminal is located in the vehicle, in which the position indication information is configured for indicating that the terminal is located in the vehicle, so that the electronic control unit maintains the short-range wireless connection.

In one possible implementation, the third determining module may be further configured to determine that the terminal is located outside the vehicle in case that the signal strength information becomes smaller and the moving state information represents that the terminal is currently in the moving state.

With respect to the devices in the above embodiments, the specific manners for performing operations for individual modules have been described in detail in the embodiments regarding the method for controlling the short-range wireless connection, which will not be elaborated herein.

Figure 11:
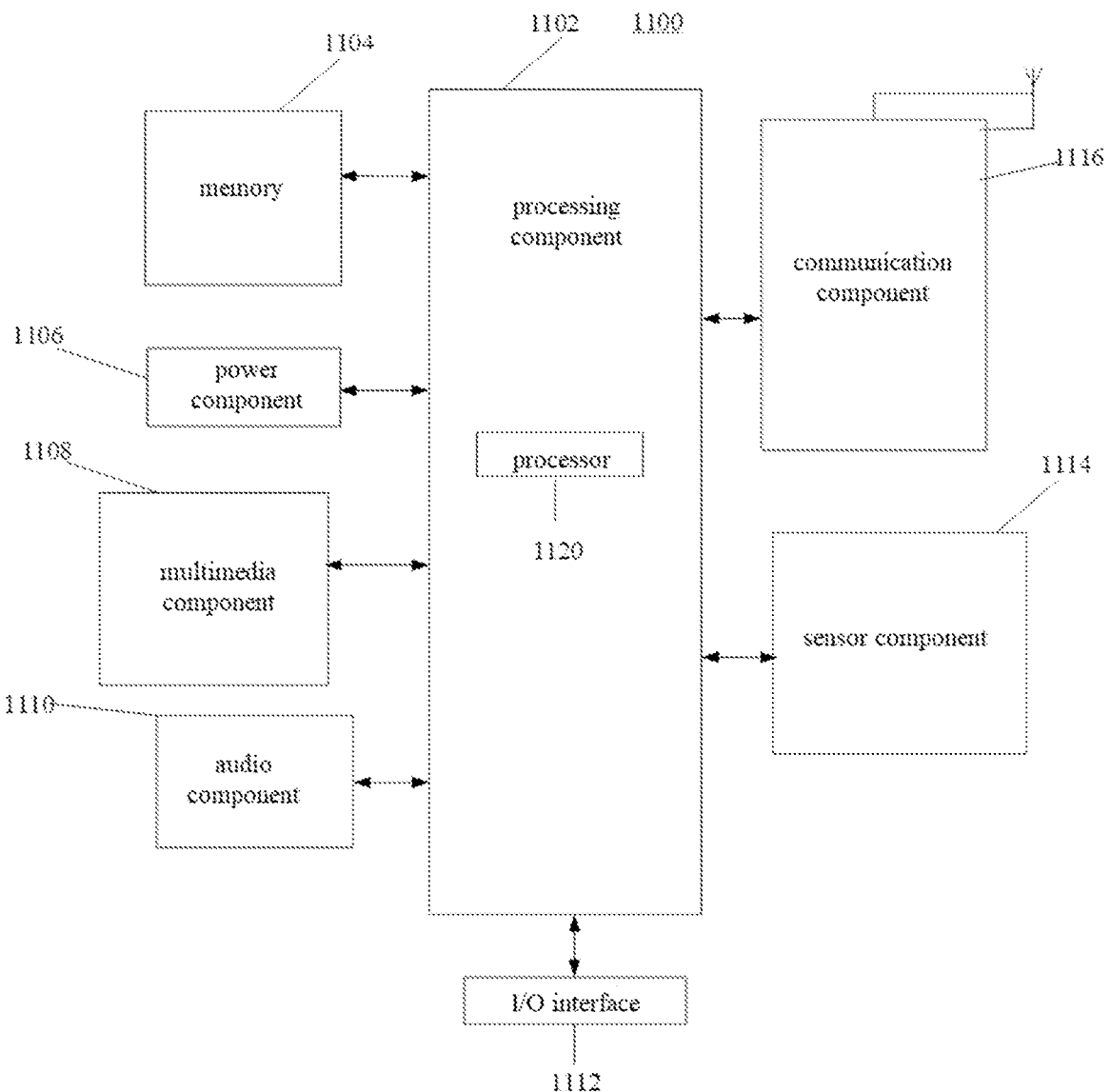
FIG. 11 is a block diagram illustrating an electronic device according to an embodiment.

FIG. 11 is a block diagram illustrating an electronic device 1100 according to an embodiment. For example, the electronic device 1100 may be a terminal, such as a mobile phone, a computer, a digital broadcast terminal, a messaging device, a game console, a tablet device, a medical device, a fitness device, a personal digital assistant, or the like.

Referring to FIG. 11, the electronic device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the electronic device 1100, such as the operations associated with display, phone calls, data communications, camera operations, and recording operations. The processing component 1102 can include one or more processors 1120 to execute instructions to perform all or some of the steps in the method for controlling the short-range wireless connection applied to the terminal. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the electronic device 1100. Examples of such data include instructions for any applications or methods operated on the electronic device 1100, contact data, phonebook data, messages, pictures, videos, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the electronic device 1100. The power component 1106 may include a power management system, one or more power sources, and any other components associated with the generation, management, and distribution of power in the electronic device 1100.

The multimedia component 1108 includes a screen providing an output interface between the electronic device 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. The front camera and/or the rear camera may receive an external multimedia datum while the electronic device 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone (MIC) configured to receive an external audio signal when the electronic device 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as keyboards, click wheels, buttons, and the like. The buttons may include, but are not limited to, a home button, a volume button, a starting button, and a locking button.

The sensor component 1114 includes one or more sensors to provide status assessments of various aspects of the electronic device 1100. For instance, the sensor component 1114 may detect an on/off status of the electronic device 1100, relative positioning of components, e.g., the display and the keypad, of the electronic device 1100, a change in position of the electronic device 1100 or a component of the electronic device 1100, a presence or absence of user contact with the electronic device 1100, an orientation or an acceleration/deceleration of the electronic device 1100, and a change in temperature of the electronic device 1100. The sensor component 1114 may include a proximity sensor configured to detect the presence of nearby objects without any physical contact. The sensor component 1114 may further include a light sensor, such as a CMOS or CCD image sensor, for use in imaging applications. In some embodiments, the sensor component 1114 may further include an acceleration sensor, a gyroscope sensor, a magnetic sensor, a pressure sensor, or a temperature sensor.

The communication component 1116 is configured to facilitate wired or wireless communication between the electronic device 1100 and other devices. The electronic device 1100 can access a wireless network based on a communication standard, such as Wi-Fi, 2G, or 3G, or a combination thereof. In an illustrative embodiment, the communication component 1116 receives a broadcast signal or broadcast associated information from an external broadcast management system via a broadcast channel. In an illustrative embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a short-range wireless technology (such as Bluetooth®), and other technologies.

In an illustrative embodiment, the electronic device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the method for controlling the short-range wireless connection applied to the terminal in the above-mentioned embodiments.

In an illustrative embodiment, there is also provided a non-transitory computer readable storage medium including instructions, such as the memory 1104 including instructions, executable by the processor 1120 in the electronic device 1100, for completing the above-mentioned method for controlling the short-range wireless connection applied to the terminal. For example, the non-transitory computer-readable storage medium may be a ROM, a random access memory (RAM), a CD-ROM, a magnetic tape, a floppy disc, an optical data storage device, and the like.

In another embodiment, there is also provided a computer program product including a computer program executable by a programmable apparatus, in which the computer program has code portions for performing the method for controlling the short-range wireless connection applied to the terminal when executed by the programmable apparatus.

Figure 12:
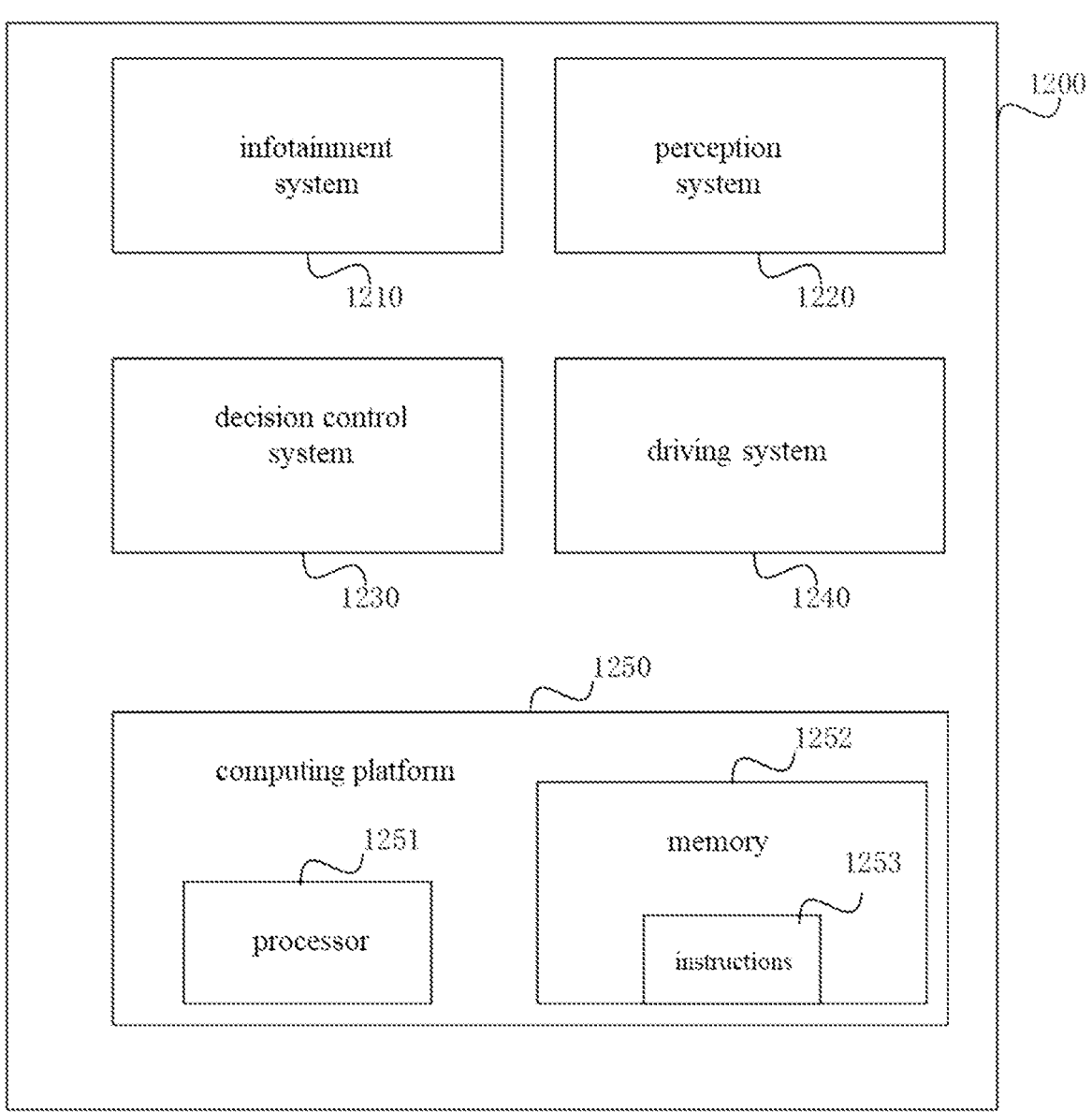
FIG. 12 is a block diagram illustrating a vehicle according to an embodiment.

FIG. 12 is a block diagram illustrating a vehicle 1200 according to an embodiment. For example, the vehicle 1200 may be a hybrid vehicle, or may be a non-hybrid vehicle, an electric vehicle, a fuel cell vehicle, or another type of vehicle. The vehicle 1200 may be a self-driving vehicle, a semi-self-driving vehicle, or a non-self-driving vehicle.

Referring to FIG. 12, the vehicle 1200 may include various subsystems, for example, an infotainment system 1210, a perception system 1220, a decision control system 1230, a driving system 1240, and a computing platform 1250. The vehicle 1200 may also include more or fewer subsystems, and each subsystem may include a plurality of components. In addition, the interconnection between subsystems and between components of the vehicle 1200 may be implemented by means of wire or wireless.

In some embodiments, the infotainment system 1210 may include a communication system, an entertainment system, a navigation system, and the like.

The perception system 1220 may include several types of sensors for sensing information of the environment surrounding the vehicle 1200. For example, the perception system 1220 may include a global positioning system (which may be a GPS system or a Beidou® system or other positioning system), an inertial measurement unit (IMU), a lidar, a millimeter-wave radar, an ultrasound radar, and a camera.

The decision control system 1230 may include a computing system, a vehicle controller, a steering system, a throttle, and a braking system.

The driving system 1240 may include components that provide powered motion to the vehicle 1200. In one embodiment, the driving system 1240 may include an engine, an energy source, a transmission system, and wheels. The engine may be one or a combination of internal combustion engines, electric motors, air compression engines. The engine is capable of converting energy provided by the energy source into mechanical energy.

Some or all of the functions of the vehicle 1200 are controlled by the computing platform 1250. The computing platform 1250 may include at least one processor 1251 and memory 1252, in which the processor 1251 may execute instructions 1253 stored in the memory 1252.

The processor 1251 may be any conventional processor, such as a commercially available CPU. The processor may also include, for example, a graphic process unit (GPU), a field programmable gate array (FPGA), a system on a chip (SOC), an application specific integrated circuit (ASIC), or a combination thereof.

The memory 1252 may be implemented using any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

In addition to the instructions 1253, the memory 1252 may store data such as road maps, route information, vehicle position, direction, speed, etc. The data stored by the memory 1252 may be used by the computing platform 1250.

In embodiments of the disclosure, the processor 1251 may execute the instructions 1253 to perform all or some of the steps in the method for controlling the short-range wireless connection applied to the electronic control unit.

In another embodiment, there is also provided a computer readable storage medium including program instructions which, when executed by the processor, implement a step of the method for controlling the short-range wireless connection applied to the electronic control unit. For example, the computer-readable storage medium may be the memory 1252 including program instructions executable by the processor 1251 of the vehicle 1200 to perform the method for controlling the short-range wireless connection applied to the electronic control unit.

In another embodiment, there is also provided a computer program product including a computer program executable by a programmable apparatus, in which the computer program has code portions for performing the method for controlling the short-range wireless connection applied to the terminal when executed by the programmable apparatus.

According to a first aspect of disclosure, there is provided a method for controlling short-range wireless connection, executed by an electronic control unit on a vehicle, includes: controlling a loudspeaker on the vehicle to send an ultrasonic signal, in which the ultrasonic signal is configured for a target terminal to determine position information of the target terminal relative to the loudspeaker, and the target terminal is connected to the electronic control unit via the short-range wireless connection; determining whether the target terminal is located in the vehicle based on the position information in response to receiving the position information sent by the target terminal; and maintaining the short-range wireless connection in response to determining that the target terminal is located in the vehicle.

Alternatively, the method further includes: disconnecting the short-range wireless connection in response to determining that the target terminal is located outside the vehicle.

Alternatively, controlling the loudspeaker on the vehicle to send the ultrasonic signal includes: obtaining identification information of the target terminal; and controlling the loudspeaker to send the ultrasonic signal, in which the ultrasonic signal carries the identification information.

Alternatively, the method further includes: determining that the target terminal is located in the vehicle in response to receiving position indication information sent by the target terminal, wherein the position indication information is configured for indicating that the target terminal is located in the vehicle.

According to a second aspect of the disclosure, there is provided a method for controlling short-range wireless connection, executed by a terminal, includes: receiving an ultrasonic signal sent by a loudspeaker on a vehicle; determining position information of the terminal relative to the loudspeaker based on the ultrasonic signal; and sending the position information to an electronic control unit on the vehicle, in which the position information is configured for the electronic control unit to determine whether to maintain the short-range wireless connection with the terminal.

Alternatively, the ultrasonic signal carries identification information of an apparatus connected to the electronic control unit via short-range wireless; and the method further includes: obtaining the identification information from the ultrasonic signal; and performing a step of determining the position information of the terminal relative to the loudspeaker based on the ultrasonic signal in response to determining that the identification information matches identification information of the terminal.

Alternatively, the method further includes: obtaining signal strength information and moving state information of the terminal in case that the position information is not determined, in which the signal strength information is configured for representing a short-range wireless signal strength between the terminal and the electronic control unit; determining whether the terminal is located in the vehicle based on the signal strength information and the moving state information; and disconnecting the short-range wireless connection in response to determining that the terminal is located outside the vehicle.

Alternatively, the method further includes: sending the position indication information to the electronic control unit in response to determining that the terminal is located in the vehicle, in which the position indication information is configured for indicating that the terminal is located in the vehicle, so that the electronic control unit maintains the short-range wireless connection.

Alternatively, determining whether the terminal is located in the vehicle based on the signal strength information and the moving state information includes: determining that the terminal is located outside the vehicle in case that the signal strength information becomes smaller and the moving state information represents that the terminal is currently in a moving state.

According to a third aspect of the disclosure, there is provided a device for controlling short-range wireless connection, including: a first controlling module configured to control a loudspeaker on a vehicle to send an ultrasonic signal, in which the ultrasonic signal is configured for a target terminal to determine position information of the target terminal relative to the loudspeaker, and the target terminal is connected to the electronic control unit via the short-range wireless connection; and a first determining module configured to determine whether the target terminal is located in the vehicle based on the position information in response to receiving the position information sent by the target terminal; in which the first controlling module is further configured to maintain the short-range wireless connection in response to the first determining module determining that the target terminal is located in the vehicle.

Alternatively, the first controlling module is further configured to disconnect the short-range wireless connection in response to the first determining module determining that the target terminal is located outside the vehicle.

Alternatively, the first controlling module includes: a first obtaining submodule configured to obtain address information of the target terminal; a controlling submodule configured to control the loudspeaker to send the ultrasonic signal, in which the ultrasonic signal carries the address information.

Alternatively, the first determining module is further configured to determine that the target terminal is located in the vehicle in response to receiving position indication information sent by the target terminal, in which the position indication information is configured for indicating that the target terminal is located in the vehicle.

According to a fourth aspect of the disclosure, there is provided a device for controlling short-range wireless connection, including: a receiving module configured to receive an ultrasonic signal sent by a loudspeaker on a vehicle; a second determining module configured to determine position information of a terminal relative to the loudspeaker based on the ultrasonic signal; and a sending module configured to send the position information to an electronic control unit on the vehicle, in which the position information is configured for the electronic control unit to determine whether to maintain the short-range wireless connection with the terminal.

Alternatively, the ultrasonic signal carries address information of an apparatus connected to the electronic control unit via short-range wireless; and the device further includes: a first obtaining module configured to obtain the address information from the ultrasonic signal; and a second determining module further configured to determine the position information of the terminal relative to the loudspeaker based on the ultrasonic signal in response to determining that the address information matches address information of the terminal.

Alternatively, the device further includes: a second obtaining module configured to obtain signal strength information and moving state information of the terminal in case that the position information is not determined by the second obtaining module, in which the signal strength information is configured for representing a short-range wireless signal strength between the terminal and the electronic control unit; a third determining module configured to determine whether the terminal is located in the vehicle based on the signal strength information and the moving state information; and a second controlling module configured to disconnect the short-range wireless connection in response to the third determining module determining that the terminal is located outside the vehicle.

Alternatively, the sending module is further configured to send the position indication information to the electronic control unit in response to the third determining module determining that the terminal is located in the vehicle, in which the position indication information is configured for indicating that the terminal is located in the vehicle, so that the electronic control unit maintains the short-range wireless connection.

Alternatively, a third controlling module is further configured to determine that the terminal is located outside the vehicle in case that the signal strength information becomes smaller and the moving state information represents that the terminal is currently in a moving state.

According to a fifth aspect of the disclosure, there is provided a vehicle, including: a processor; and a memory configured to store instructions executable by the processor; in which the processor is configured to run the instructions executable by the processor to implement a method for controlling short-range wireless connection according to any item of the first aspect.

According to a sixth aspect of the disclosure, there is provided a terminal, including: a processor; and a memory configured to store instructions executable by the processor; in which the processor is configured to run the instructions executable by the processor to implement a method for controlling short-range wireless connection according to any item of the second aspect.

According to a seventh aspect of the disclosure, there is provided a computer readable storage medium, storing a computer program thereon, in which when the computer program is executed by a processor, a step of a method for controlling short-range wireless connection according to any item of the first aspect or a step of a method for controlling short-range wireless connection according to any item of the second aspect is performed.

The preferred embodiments of the disclosure have been described in detail with reference to the accompanying drawings, however, the disclosure is not limited to the specific details of the above embodiments, and various simple modifications may be made to the technical solutions of the disclosure within the scope of the technical concept of the disclosure, which fall within the scope of the disclosure.

Furthermore, it should be noted that the specific technical features described in the above specific embodiments may be combined in any suitable manner in the case of no contradiction. To avoid unnecessary repetition, various possible combinations are not explained separately in the disclosure.

In addition, any combination of the various embodiments of the disclosure may be made without departing from spirit of the disclosure, which should also be regarded as contents disclosed in the disclosure.

What is claimed is:

1. A method for controlling short-range wireless connection, executed by an electronic control unit on a vehicle, comprising:
  controlling a loudspeaker on the vehicle to send an ultrasonic signal, wherein the ultrasonic signal sent by each loudspeaker carries position information of the loudspeaker, the position information carried in the ultrasonic signal is configured for a target terminal to determine position information of the target terminal relative to the loudspeaker, and the target terminal is connected to the electronic control unit via the short-range wireless connection;
  determining whether the target terminal is located in the vehicle based on the position information in response to receiving the position information of the target terminal relative to the loudspeaker sent by the target terminal; and
  maintaining the short-range wireless connection in response to determining that the target terminal is located in the vehicle.

2. The method of claim 1, further comprising:
  disconnecting the short-range wireless connection in response to determining that the target terminal is located outside the vehicle.

3. The method of claim 1, wherein controlling the loudspeaker on the vehicle to send the ultrasonic signal comprises:
  obtaining identification information of the target terminal; and
  controlling the loudspeaker to send the ultrasonic signal, wherein the ultrasonic signal carries the identification information.

4. The method of claim 1, further comprising:
  determining that the target terminal is located in the vehicle in response to receiving position indication information sent by the target terminal, wherein the position indication information is configured for indicating that the target terminal is located in the vehicle.

5. The method of claim 1, wherein controlling a loudspeaker on the vehicle to send an ultrasonic signal comprises:
  controlling the loudspeaker to send the ultrasonic signal once.

6. The method of claim 1, wherein controlling a loudspeaker on the vehicle to send an ultrasonic signal comprises:
  controlling the loudspeaker to continuously send the ultrasonic signal.

7. The method of claim 1, wherein controlling a loudspeaker on the vehicle to send an ultrasonic signal comprises:
  controlling the loudspeaker to periodically send the ultrasonic signal.

8. The method of claim 1, wherein the vehicle comprises two or more loudspeakers, and the electronic control unit is configured to control each of the two or more loudspeakers to send the ultrasonic signal.

9. A method for controlling short-range wireless connection, executed by a terminal, comprising:
  receiving an ultrasonic signal sent by a loudspeaker on a vehicle, wherein the ultrasonic signal sent by each loudspeaker carries position information of the loudspeaker;
  determining position information of the terminal relative to the loudspeaker based on the position carried in the ultrasonic signal; and
  sending the position information of the terminal relative to the loudspeaker to an electronic control unit on the vehicle, wherein the position information is configured for the electronic control unit to determine whether to maintain the short-range wireless connection with the terminal.

10. The method of claim 9, wherein the ultrasonic signal carries identification information of an apparatus connected to the electronic control unit via short-range wireless; and the method further comprises:
  obtaining the identification information from the ultrasonic signal; and
  performing a step of determining the position information of the terminal relative to the loudspeaker based on the ultrasonic signal in response to determining that the identification information matches identification information of the terminal.

11. The method of claim 9, the method further comprising:
  obtaining signal strength information and moving state information of the terminal in case that the position information is not determined, wherein the signal strength information is configured for representing a short-range wireless signal strength between the terminal and the electronic control unit;
  determining whether the terminal is located in the vehicle based on the signal strength information and the moving state information; and
  disconnecting the short-range wireless connection in response to determining that the terminal is located outside the vehicle.

12. The method of claim 11, further comprising:
  sending position indication information to the electronic control unit in response to determining that the terminal is located in the vehicle, wherein the position indication information is configured for indicating that the terminal is located in the vehicle, so that the electronic control unit maintains the short-range wireless connection.

13. The method of claim 11, wherein determining whether the terminal is located in the vehicle based on the signal strength information and the moving state information comprises:

determining that the terminal is located outside the vehicle in case that the signal strength information becomes smaller and the moving state information represents that the terminal is currently in a moving state.

14. A device for controlling short-range wireless connection, comprising:

a first controlling module configured to control a loudspeaker on a vehicle to send an ultrasonic signal, wherein the ultrasonic signal sent by each loudspeaker carries position information of the loudspeaker, the position information carried in the ultrasonic signal is configured for a target terminal to determine position information of the target terminal relative to the loudspeaker, and the target terminal is connected to an electronic control unit via the short-range wireless connection; and a first determining module configured to determine whether the target terminal is located in the vehicle based on the position information in response to receiving the position information of the target terminal relative to the loudspeaker sent by the target terminal;

wherein the first controlling module is further configured to maintain the short-range wireless connection in response to the first determining module determining that the target terminal is located in the vehicle.

15. The device of claim 14, wherein the first controlling module is further configured to disconnect the short-range wireless connection in response to the first determining module determining that the target terminal is located outside the vehicle.

16. The device of claim 14, wherein the first controlling module comprises:

a first obtaining submodule configured to obtain address information of the target terminal; and a controlling submodule configured to control the loudspeaker to send the ultrasonic signal, wherein the ultrasonic signal carries the address information.

17. The device of claim 14, wherein the first determining module is further configured to determine that the target terminal is located in the vehicle in response to receiving position indication information sent by the target terminal, wherein the position indication information is configured for indicating that the target terminal is located in the vehicle.

18. A vehicle, comprising:

a processor; and a memory configured to store instructions executable by the processor;

wherein the processor is configured to run the instructions executable by the processor to implement the method for controlling short-range wireless connection according to claim 1.

19. A terminal, comprising:

a processor; and a memory configured to store instructions executable by the processor;

wherein the processor is configured to run the instructions executable by the processor to implement the method for controlling short-range wireless connection according to claim 9.

20. A non-transitory computer readable storage medium, storing a computer program thereon, wherein when the computer program is executed by a processor, a step of the method for controlling short-range wireless connection according to claim 1 or a step of the method for controlling short-range wireless connection according to claim 9 is performed.

* * * * *